March 20, 1962 — G. A. LYON — 3,025,818
METHOD OF MAKING WHEEL TRIM
Filed Jan. 12, 1960 — 2 Sheets-Sheet 1
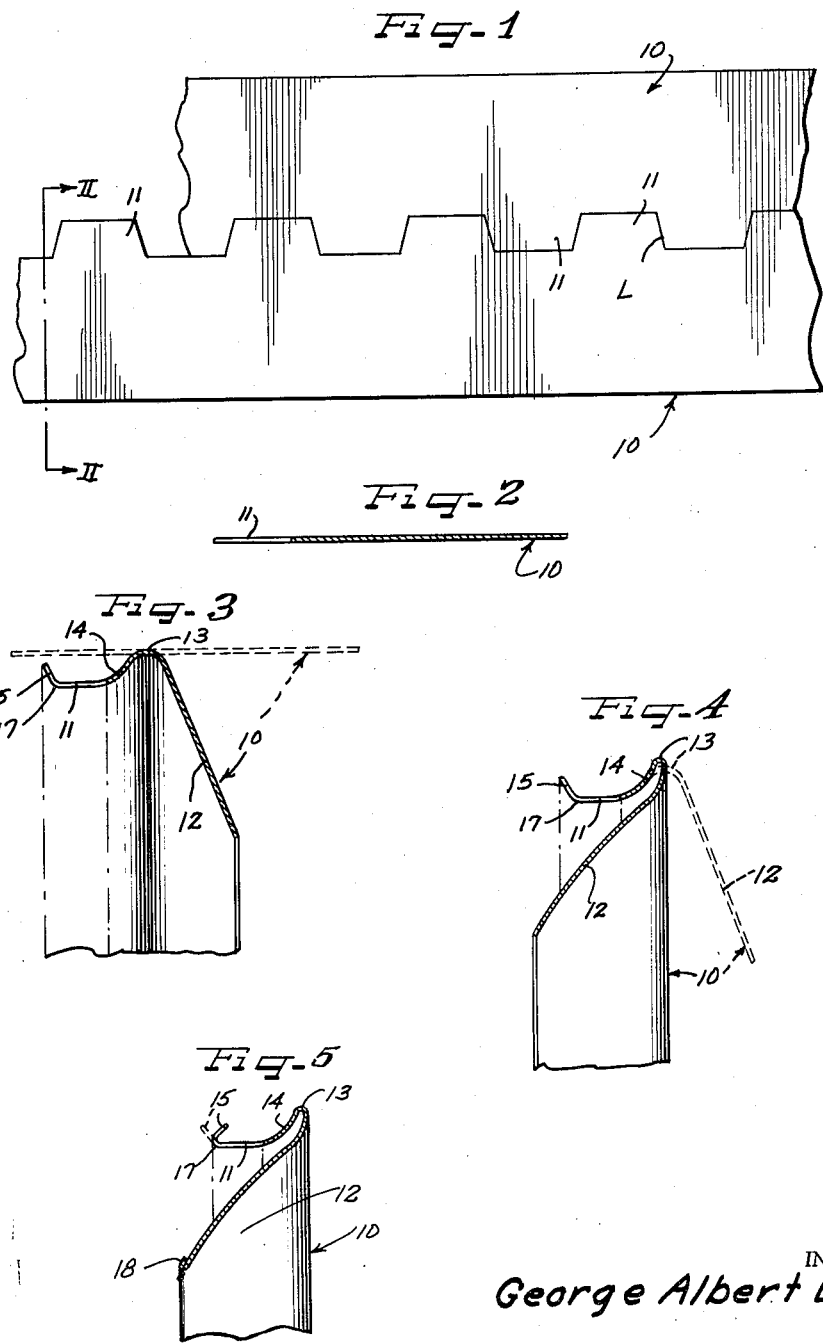
INVENTOR
George Albert Lyon
ATTORNEYS March 20, 1962 G. A. LYON 3,025,818
METHOD OF MAKING WHEEL TRIM
Filed Jan. 12, 1960 2 Sheets-Sheet 2
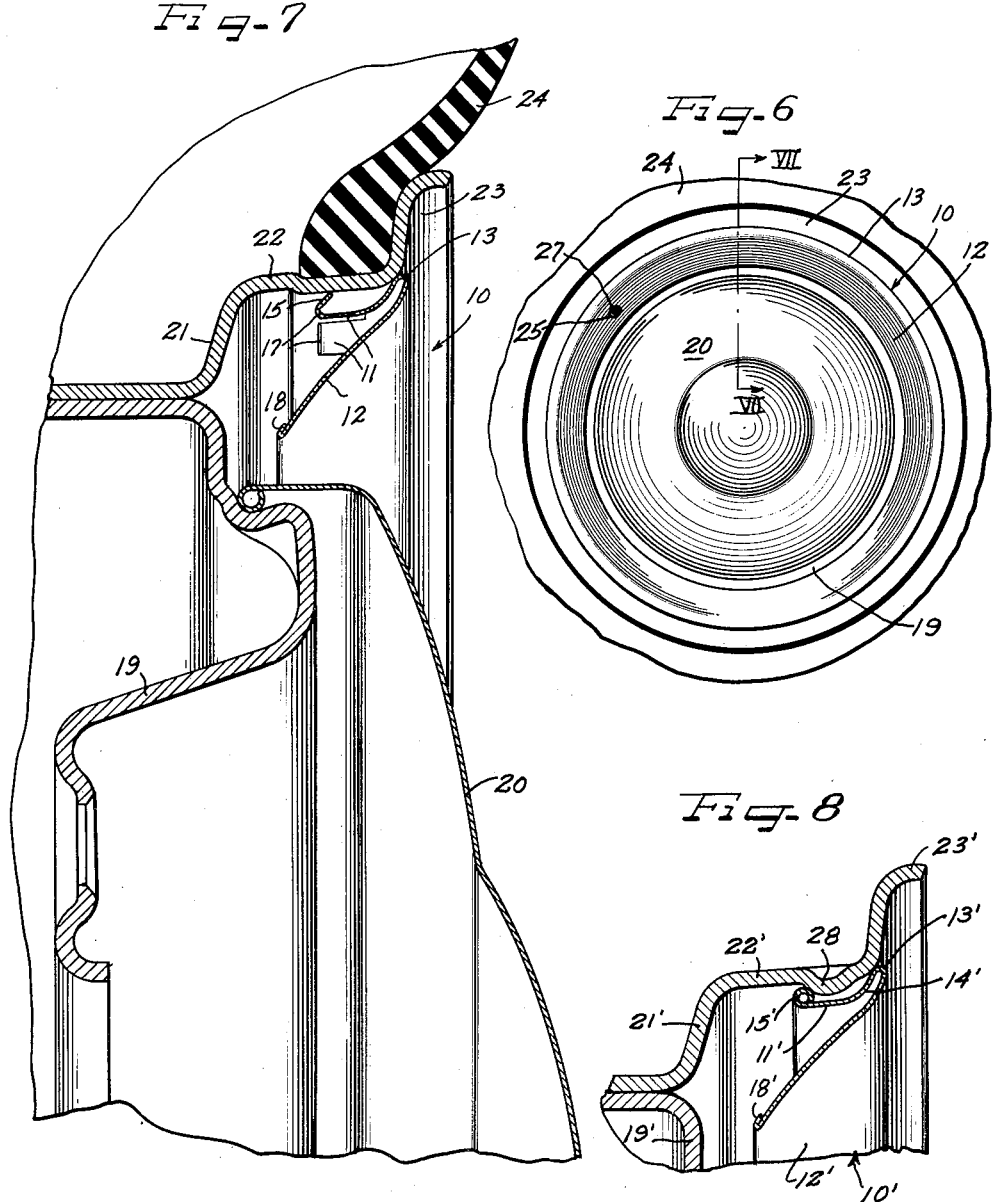
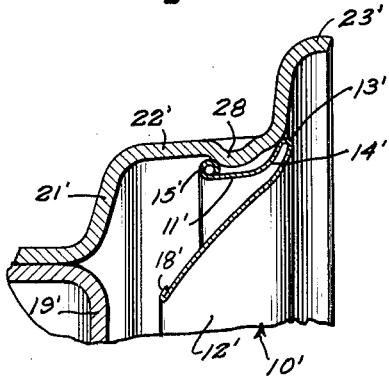
INVENTOR
*George Albert Lyon*
ATTORNEYS

United States Patent Office 3,025,818
Patented Mar. 20, 1962

3,025,818
METHOD OF MAKING WHEEL TRIM
George Albert Lyon, Detroit, Mich., assignor to Lyon Incorporated, Detroit, Mich., a corporation of Delaware
Filed Jan. 12, 1960, Ser. No. 2,051
6 Claims. (Cl. 113—116)

The present invention relates to improvements in making wheel trim adapted to be attached in press-on, pry-off relation over the outer side of a vehicle wheel such as an automobile wheel.

Wheel trim rings of the kind that are employed for protective and decorative disposition over especially the tire rim and the adjacent portion of a wheel body supporting a tire rim can, of course, be made by die stamping and shaping the same from wide strips of sheet metal stock, involving the punching out of a central scrap blank of substantial diameter for which it is often difficult to find a profitable use. It is therefore highly desirable to produce trim rings by shaping the same from narrow strip stock with little or no waste from scrap. With certain shapes of such trim rings, however, difficulties are encountered in converting the straight strip stock into a ring shaped member having desirable transverse contours and retaining flange structure therebehind.

It is accordingly an important object of the present invention to provide an improved method of making wheel trim members from narrow sheet metal strips.

Another object of the invention is to provide an improved method of making sheet metal trim rings by rolling sheet metal strip stock into the circular form the rings are to take.

A further object of the invention is to provide an improved method of making vehicle wheel trim rings economically and without waste of material by rolling the same from sheet metal strip stock to a preliminary contour and then completing formation of the trim rings in steps adapted to be performed in die press equipment.

Still another object of the invention is to provide an improved method of making trim rings for vehicle wheels, according to which method strip stock is rolled to provide a body flange at a convenient rolling angle and disposed at the inside of the ring and extending in one general axial direction from which the body flange is displaced to extend in generally the opposite axial direction without warpage or wrinkling of the material of the body flange.

Other objects, features and advantages of the present invention will be readily apparent from the following detailed description of certain preferred embodiments thereof taken in conjunction with the accompanying drawings, in which:

FIGURE 1 is a fragmentary plan view of sheet metal strip stock from which trim rings according to the present invention are adapted to be made;

FIGURE 2 is a transverse sectional detail view through a trim ring section of the strip stock of FIGURE 1, but enlarged to double the scale of FIGURE 1;

FIGURE 3 is a sectional view similar to FIGURE 2 but showing the strip after it has been subjected to a rolling operation to provide ring form;

FIGURE 4 is a similar sectional view but showing the ring member after a further operation thereon which may be effected in suitable die apparatus;

FIGURE 5 is a sectional view similar to FIGURE 4 but showing final steps in completing the trim ring;

FIGURE 6 is an outer side elevational view of a vehicle wheel showing the finished ring in place thereon;

FIGURE 7 is a fragmentary radial sectional detail view taken substantially on the line VII—VII of FIGURE 6; and FIGURE 8 is a sectional detail view similar to FIGURE 7 but showing a slight modification of the trim ring.

In the production of an economical wheel trim ring, sheet metal strip stock of thin gauge such as stainless steel, brass, aluminum alloy, or the like is provided in a width equal to the stock needed to provide two trim rings in each unit length of the original strip. This strip is, as shown in FIGURE 1 longitudinally centrally severed along a uniformly angularly jagged line L to provide two equal blank strips 10 having equal finger extensions 11 along the severance line L while the remaining edges of the strips may, as shown, remain straight at the outside edges of the original blank.

In the next operation, each of the strip sections 10 is rolled from the flat condition shown in FIGURES 1 and 2, as well as in dash outline in FIGURE 3 into the transversely contoured shape shown in full outline in FIGURE 3 and at the same time shaped into the circular diameter of the ultimate trim ring. In this circular diameter, the free ends of the strip section are secured permanently together, desirably by butt welding the end edges, thereby to produce an endless annulus in which a body flange 12 comprises the major portion of the width of the ring and extends radially inwardly and slopes toward the axially outer side of the ring, that is, toward that side which faces outwardly of the wheel when the ring is applied thereto, substantially as shown in FIGURE 3. At the outer perimeter of the ring an annular radially outwardly projecting juncture rib 13 joins the body flange portion 12 with an underturned flange portion 14 extending radially and axially inwardly and from which the finger extensions 11 project axially inwardly. At their axially inner end portions, the finger extensions 11 are formed with generally radially outwardly and axially inwardly extending short terminal portions 15 joined to the main body portions of the finger extensions along bend lines 17. It will be appreciated that the cross-sectional shape to which the ring has been formed as shown in FIGURE 3 is especially efficient for accurate formation in suitable shaping rolls under high speed operation of such rolls since the several contours are of moderate depth and width without sharp corners and thus involve minimum frictional resistance or forming pressures in the operation of the shaping rolls.

Although the main body flange 12 of the ring member 10 extends substantially radially inwardly, as rolled, the axially outward inclination thereof avoids buckling warpage strains therein. Moreover, the large radius curvature in the cross-section of the rolled juncture rib 13 enables accurate rolling control to shape the metal strip into the circular ring form of the piece.

However, in the finished form of the ring 10, as shown in FIGURES 6 and 7, it is desirable to have the body flange portion 12 of the ring extend radially and axially inwardly. I have found that this can be readily effected by folding the body flange portion 12 axially inwardly toward the underturned marginal flange portion 14 from the original rolled position of the body flange portion, as depicted in FIGURE 4. This can be readily done in a suitable die press. In this operation, the radially outer extremity portion of the body flange 12 providing the axially outer side of the juncture rib 13 is bent axially inwardly collapsibly toward the underturned flange 14, thereby swinging the body flange 12 axially inwardly, the bending continuing until the body flange has attained the desired axially and radially inward orientation shown in full lines in FIGURE 4 as compared to the dash outline original position. Such displacement of the body flange 12 is accomplished without any permanent buckling warpage thereof even though in moving from the axially outwardly oriented position shown in dash outline to the axially inwardly oriented position shown in full outline the flange must pass through a contraction zone tending toward greatest warpage of the flange as it attains about the midpoint between the two orientations shown, namely when the flange attains a substantially radial plane. This warpage tendency, herein, is utilized to advantage because since the body flange 12 is without reinforcement to its inner free edge, it is free to flex resiliently and at least through a limited warpage range without taking a permanent set. Therefore, as soon as the flange body 12 is forced axially inwardly through and past said radial plane, the resiliently flexible warpage causes the flange body to snap axially inwardly to a fully expanded position which is then maintained by the setting of the outer marginal bent-in juncture portion of the body flange. In the axially inward displaced position thereof, the body flange 12 may then be sized and contoured as preferred.

As final steps in completing the trim ring 10, the finger terminals 15 are bent along the juncture bend lines 17 from the dash position of FIGURE 5 into the full line position wherein they extend as short stiff retaining terminals obliquely radially and axially outwardly. Also, the inner edge of the body flange 12 may be finished by bending the extremity under to provide a finishing and reinforcing flange 18.

After completion of the finishing of the ring member 10 it is adapted to be applied in press-on, pry-off relation over a vehicle wheel as shown in FIGURES 6 and 7 including a disk spider wheel body 19 carrying a hub cap 20 over the central portion thereof and peripherally supporting a tire rim 21 of the multi-flange, drop center type including an intermediate flange 22 and a terminal flange 23 and arranged to support a pneumatic tire 24. The trim ring 10 is dimensioned to overlie the tire rim 21 and the adjacent portion of the wheel body 19, with the retaining finger terminals 15 engaging at their edges retainingly with the intermediate flange 22 of the tire rim and the underturned flange 14 of the ring member at the juncture 13 being engageable with the rim shoulder between the intermediate flange 22 and the terminal flange 23. Normally, of course, the tips of the finger terminals 15 extend to a slightly greater diameter than the engaged diameter of the intermediate flange 22 and the retaining fingers 11 are thus slightly compressed to a tensioned relation whereby grip of the retaining finger terminals 11 is enhanced.

In the assembled relationship of the trim ring 10 upon the wheel, a valve stem opening 25 therein is registered with a valve stem 27 projecting from the tire rim and extending through the opening.

In the modification of FIGURE 8, the trim ring 10' is constructed to be made according to the same method already described for the trim ring 10, and primed reference numerals show corresponding parts. The difference resides in that instead of a circumferential series of cover retaining fingers 11, the trim retaining structure is in the form of a continuous annular generally axially inwardly extending flange 11' having a generally radially out turned continuous annular terminal bead 15' instead of individual retaining flange terminal and the bead 15' is adapted to engage in resiliently tensioned press-on, pry-off relation over radially inwardly projecting retaining protrusion bumps 28 in the tire rim intermediate flange 22'. Application and removal of the trim ring 10' is the same as the trim ring 10, each being adapted to be pressed into position and to be pried free from the wheel by means of a pry-off tool such as a screwdriver which may be inserted behind the perimeter 13 or 13' of the trim rings.

It will be understood that modifications and variations may be effected without departing from the scope of the novel concepts of the present invention.

I claim as my invention:

1. In a method of making an annular wheel trim to be applied to the axially outer side of a vehicle wheel, rolling a strip of sheet metal of predetermined width and length into a substantially circular form and in such rolling shaping the strip cross-sectionally into a wheel engaging flange portion projecting generally axially inwardly relative to the side of the trim which will have an axially outwardly facing orientation when positioned on the wheel and with a body flange of substantial width extending from a juncture with the axially outer end of said wheel engaging flange portion generally radially inwardly and axially outwardly with respect to said orientation, joining the ends of the strip permanently together to provide a continuous ring, and applying bending pressure to the axially outer side of the juncture portion of said body flange and thereby collapsibly swinging the body flange axially inwardly until the body flange has attained an axially and radially inward position.

2. In a method of making circular sheet metal members, shaping a sheet metal piece into ring form with a generally axially extending flange portion and a body flange of substantial width projecting from a juncture with said axially extending flange portion generally radially inwardly and axially relative to one axial side of the ring member, and bending the body flange portion of said juncture toward the opposite axial side of the ring and thereby swinging the body flange to project generally radially inwardly and axially relative to said opposite axial side.

3. In a method of making a circular sheet metal member, shaping a sheet metal piece into a ring form with a circular peripheral radially outwardly projecting rib of substantial radius curvature and having projecting generally radially inwardly and axially obliquely from one axial side of the ring a body flange of substantial width, and bendingly collapsing said rib and forcing said body flange to project radially inwardly and axially from the opposite axial side of the ring.

4. In a method of making a circular sheet metal ring member, shaping a sheet metal piece into a circular form with a radially outer peripheral generally axially extending flange portion having a radially outwardly projecting circular rib of substantial radius curvature providing juncture with a generally radially inwardly projecting body flange of substantial width also extending obliquely generally axially from the axial side of the ring opposite to the direction of projection of said flange portion, and bendingly collapsing said rib axially toward said flange portion and at the same time swinging said body flange in the same axial direction and snapping it into a radially inward and axially oblique orientation from said side of the ring member from which said flange portion projects.

5. The method of claim 4 including as an additional step turning the inner edge of said body flange into a reinforcing and finishing terminus after said body flange has been snapped into said orientation as defined.

6. The method as defined in claim 4 including the additional step of turning the free extremity of said flange portion generally radially outwardly to afford retaining engagement terminal structure engageable with a member to which the ring is adapted to be applied.

References Cited in the file of this patent

FOREIGN PATENTS 467,114    Canada _____ Aug. 8, 1950